E. J. BARKER.
MEASURED EXTRACTOR FOR AUTOGRAPHIC REGISTERS.
APPLICATION FILED MAR. 8, 1916.

1,279,496.

Patented Sept. 24, 1918.
3 SHEETS—SHEET 1.

Witnesses:

Inventor:
England J. Barker,
by Frank D. Thomason
Atty.

E. J. BARKER.
MEASURED EXTRACTOR FOR AUTOGRAPHIC REGISTERS.
APPLICATION FILED MAR. 8, 1916.
1,279,496.
Patented Sept. 24, 1918.
3 SHEETS—SHEET 2.
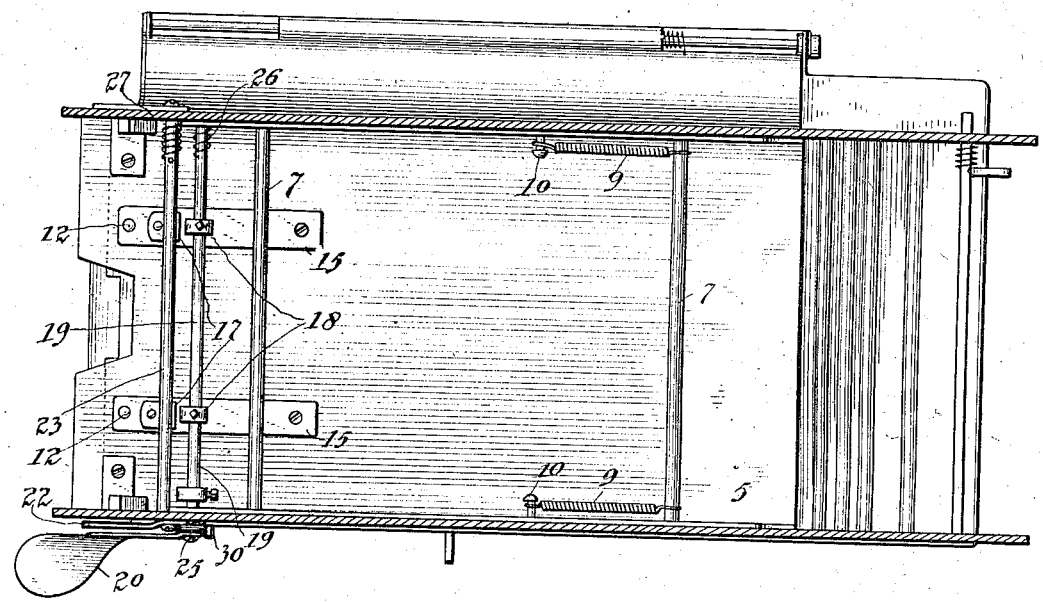
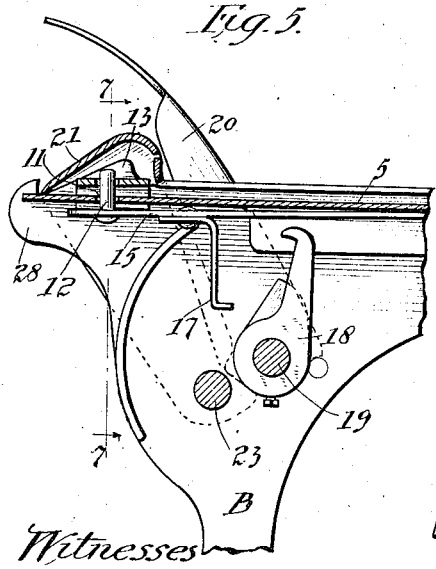
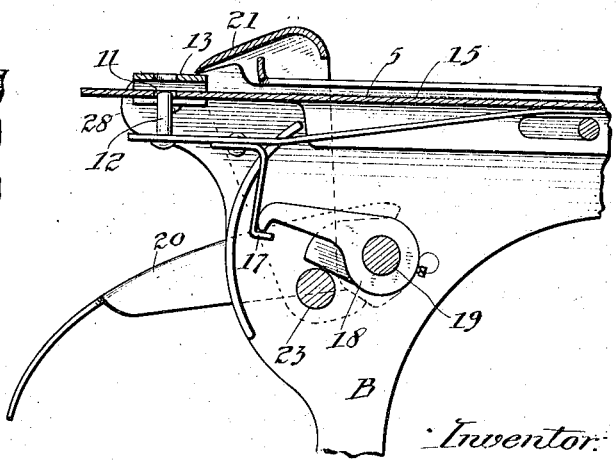

E. J. BARKER.
MEASURED EXTRACTOR FOR AUTOGRAPHIC REGISTERS.
APPLICATION FILED MAR. 8, 1916.
1,279,496.
Patented Sept. 24, 1918.
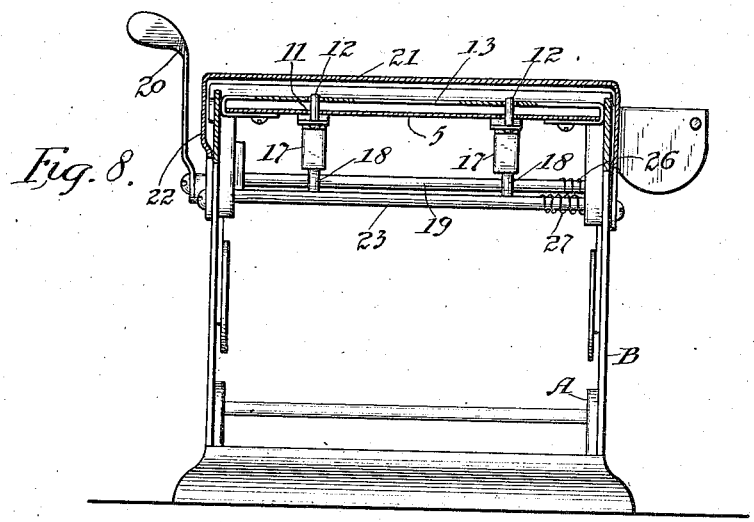
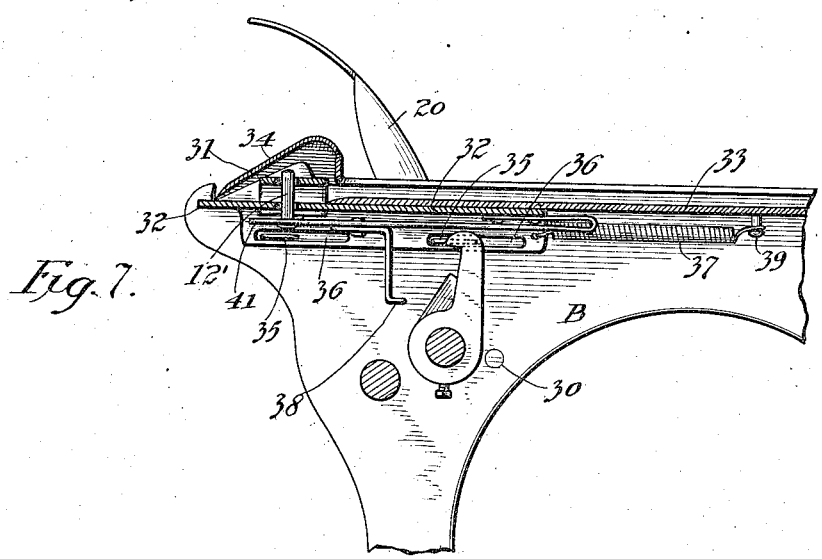

UNITED STATES PATENT OFFICE.

ENGLAND J. BARKER, OF CHICAGO, ILLINOIS.

MEASURED EXTRACTOR FOR AUTOGRAPHIC REGISTERS.

1,279,496. Specification of Letters Patent. Patented Sept. 24, 1918.

Application filed March 8, 1916. Serial No. 82,793.

*To all whom it may concern:*

Be it known that I, ENGLAND J. BARKER, a citizen of the United States, residing at Chicago, in the county of Cook and State of Illinois, have invented new and useful Improvements in Measured Extractors for Autographic Registers, of which the following is a full, clear, and exact description.

My invention relates to means for pulling out the continuous paper record strips from autographic registers, and particularly to mechanism used in connection therewith for extracting a predetermined length of strip therefrom. The record strips used in autographic registers have blank forms printed upon them which follow one another in close succession which are generally provided with two holes near their advanced edges to enable them to be filed upon letter spindles or the posts of loose leaf binders. Heretofore in order to indicate where the form that had been pulled out should be torn off from the next following form, a transverse blank marginal space was left between the forms or a transverse solid or dotted line was employed for this purpose. My invention does not rely upon the space or lines between the forms to indicate where they should be torn off, but simply makes use of the filing holes in the strips, and it does not matter how long or how short these forms may be; my improved register automatically adapts itself to the length of the forms whether the successive holes longitudinally are equi-distant or not.

The object of my invention is, therefore, to provide simple and economical mechanism for this purpose that will always pull out exactly the length of the form printed thereon and will avoid the possibility of the manifold strips creeping on one another and getting out of register with the uppermost strip. This I accomplish by the means hereinafter fully described, and as particularly pointed out in the claims.

In the drawings:

Fig. 4 is a horizontal section taken on dotted line 4—4, Fig. 2, looking upward as indicated by the arrows.

Figs. 5 and 6 are, respectively, vertical sections of the broken away forward upper portion of my improved register, drawn to an enlarged scale and illustrating the operation of the parts thereof.

Fig. 7 is a similar view of a modified construction of my invention.

Fig. 8 is a transverse vertical section taken on dotted line 7—7, Fig. 5.

Figure 1:
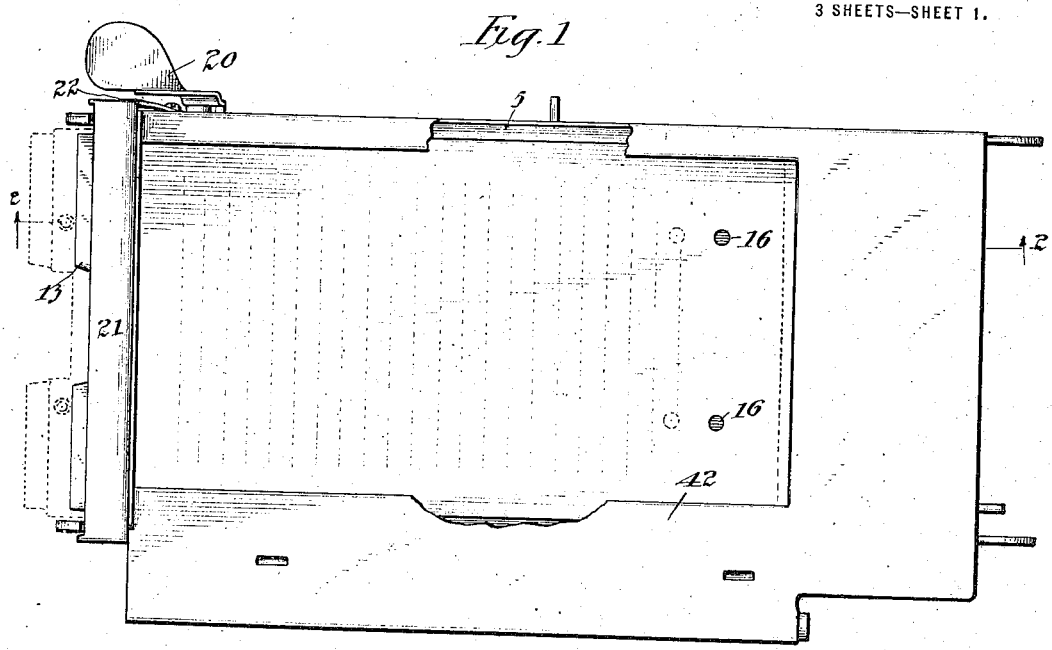
Figure 1 is a plan view of an autographic register embodying my improvements.

The drawings illustrate an autographic register comprising a lower stationary section A and an upper section B hinged to one end thereof. These sections are adapted to inclose and journal several transversely disposed rolls of continuous strips of paper in them, from which the strips of paper extend to and around transverse rollers 6, 6, 6, journaled in suitable bearings in the side-frames of upper section B at the rear of a platen 5.

This platen has a limited longitudinal reciprocable throw, and, when at the limit of its rearward movement, it extends horizontally from a point near the forwardmost roller 6 to and slightly beyond the transverse vertical plane of the front edges of the side-frames of said upper section. The side edges of said platen are flanged downward, and it is supported in a horizontal plane substantially flush with the upper horizontal edges of the side-frames of the register by means of transverse bolts 7, 7, which latter have their ends secured in said side-frames and extend through longitudinally elongated slots 8, 8, in said flanges. The length of the reciprocable movement of said platen is determined by the length of these slots 8, and normally it is kept at the limit of its rearward movement by means of longitudinally disposed coil-springs 9, 9, one end of each of which is secured to pins 10 projecting laterally inward from said flanges and the other end to rear bolt 7.

Near the front edge of the platen it is provided with two transversely alined openings 11 and with two vertical pins 12 that extend up through the same and through corresponding holes in a cross-bar 13, which latter is placed above and separated from the platen a suitable distance and has its ends bent downward and suitably secured to the sides of the platen, substantially as shown.

These pins 12 are secured at their lower ends to the forward ends of flat springs 15 that are disposed longitudinally and have their rear ends suitably attached to the underside of the platen and press upward against the same.

The paper record strips extend forward over the platen and to the front end of the same, and the use of my improved register requires that they be provided with perforations 16 in longitudinal alinement with pins 12 at the line of separation of demarcation of the forms printed on said slips, as hereinbefore stated. When the record strips are threaded through the register the forward ends of the same are threaded between the platen and cross-bar 13, and when said strips are withdrawn longitudinally forward out of the machine, pins 12 will snap up through perforations 16 in the strips and stop further advance of the same. The center of length of the forward edge of the platen is recessed or otherwise cut away at its center of length for a sufficient depth and also cross-bar 13 above it to enable the operator to get a firm grasp on the forward edge of said paper strips, and when it is desired to remove the said strips from the machine, the platen is moved to the forward limit of its movement and the strips with it and then the pins are automatically moved downward below the upper surface of the platen to release the strips. This I accomplish by means of arms 17, 17, the upper ends of which are secured to and which extend, preferably, straight down from the underside of flat springs 15, and their lower ends are bent toward the rear. These arms 17 are engaged by cams 18 that are securely mounted upon a transverse rock-shaft 19 the ends of which are journaled in stationary bearings in the side-frames of section A below the platen. The left hand end, say, of shaft 19 extends through its bearings, and has a suitable operating arm 20 extending upward and forward therefrom above the plane of the machine so that it can be easily grasped by the fingers and moved downward or depressed to rock shaft 19 until the ends of cams 18 engage arms 17 and by pushing forward against them move the platen forward to the limit of its forward movement, and as they continue their movement downward said cams engage the hooked lower ends of said arms 17 and pull the springs from which they depend and pins 12 downward into their lower position and release the paper strips.

The tearing-blade 21, which is a common and necessary element of an autographic register of the type to which my improvements apply presses down upon the paper and facilitates the tearing off of the withdrawn portion thereof, will have been raised to the upper limit of its movement off of the paper, and the operator can then freely tear off the forwardmost strip at the line of demarcation between the forwardmost form on the cutting edge of the tearing-blade.

Tearing-blade 21 consists of an upwardly and rearwardly disposed transversely extending strip of sheet metal the forward or straight cutting of which normally rests upon the platen, and when the latter is in its rearward position its upper portion arches over transverse-bar 13. The ends of this tearing-blade are provided with arms 22 which extend downward and rearward and have their lower ends securely mounted upon a transverse rock-shaft 23 that is journaled in the side-frames of section B at points slightly below and in front of the bearings of shaft 19. The lower ends of arms 22 extend to the rear of shaft 23, and when arm 20 is depressed, are engaged by the forwardly projecting portion or cams 25 secured on shaft 19 between arm 20 and the adjacent side-frame of section B. Both shafts 19 and 23 have coil-springs 26 and 27 wound around them near the bearings thereof, and these springs have one end secured to their respective shafts and the other ends are anchored in the side-frame opposite arm 20. When arm 20 is depressed and then released these springs will automatically return said shafts 19 and 23 to their normal positions, and when said arm 20 is depressed and cam 25 engages the extension 24 of arm 22 said tearing-blade will move rearwardly and upwardly from the paper on the platen, and when said arm 20 is released the said tearing-blade will automatically move downward and press upon the paper again.

If desired, the forward edges of the side-frames of upper section B of the machine are extended forward to form hooks 28 which stop the downward movement of the tearing-blade. In order to limit the rearward movement of arm 20, I provide the rear edge of said arm at a point to the rear of shaft 19 with a shoulder 29, and provide a pin 30 that projects laterally from said side-frame and is engaged by shoulder 29 to prevent further rearward movement of said arm 20.

If desired, I can, instead of giving the platen a longitudinally reciprocable movement, adopt the modification of my invention, shown in Figs. 7 and 8 of the drawings. In this modification, the forward edge of the platen is foreshortened so that it will terminate in a transverse plane slightly to the rear of a transverse bar 31, which corresponds to transverse bar 13, and provides a longitudinally reciprocable horizontal plate 32 which is in contact with the underside of the forward portion of the stationary platen 33, and has its edge projecting beyond the forward edge of said platen a sufficient distance to enable the tearing-blade to normally press down upon the forward edge of plate 32 of the modified form of my invention. This plate 32 has its longitudinal sides flanged downward and engages the inner surface of the side-frames of section B, and it is supported by means of flat pins or transverse bars 35 the ends of which are secured in said side-frames and extend through longitudinally elongated openings 36 in said flanges. This plate is retained at the limit of its rearward movement by means of coil-springs 37 that are attached at one end to the rear edges of its side flanges and at the opposite ends to pins 39 projecting downward from the underside of the platen at a suitable point to the rear of plate 32.

Figure 2:
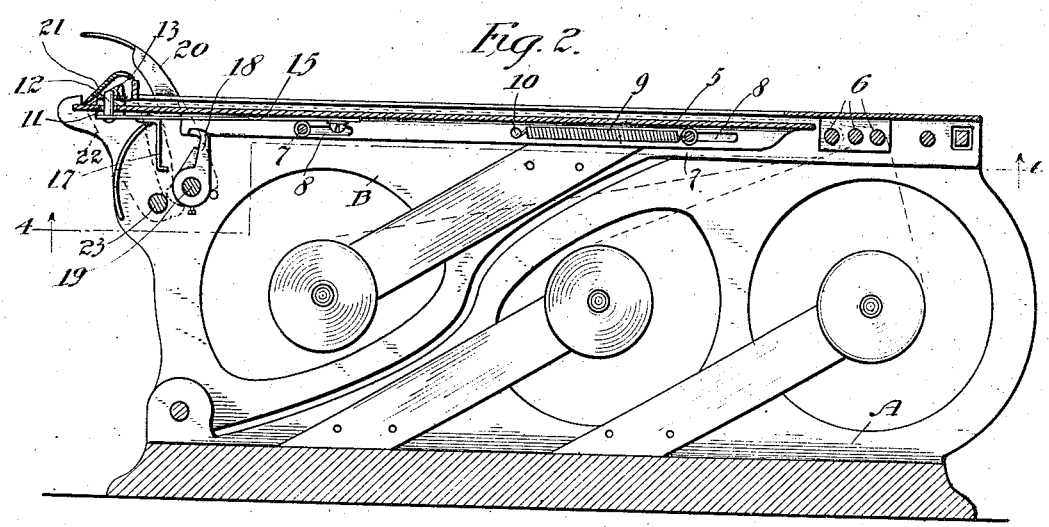
Fig. 2 is a vertical longitudinal section taken on dotted line 2—2, Fig. 1.
Figure 3:
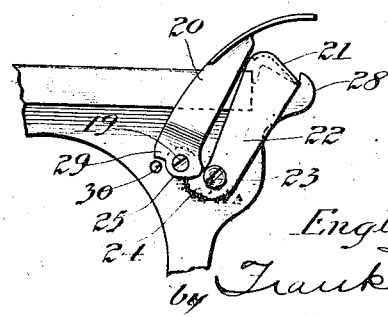
Fig. 3 is a side view of a fragment of said register showing the mechanism for actuating the cutting blade, and the paper strip releasing mechanism.

This plate has longitudinally disposed flat springs 41 secured to the underside thereof that are similar in construction to springs 15 of the preferred form of my invention, and said plate has two perforations near its forward edge that are engaged by vertical pins 12' projecting up from the forward ends of the longitudinally disposed springs 41 that are secured in their rear ends to the underside of plate 32 and correspond in all substantial respects to springs 15 of my improvements, as shown in Fig. 2 of the drawings. This plate is moved forward, and pins 12' are moved downward by the same means that engage arms 17, as hereinbefore described for moving platen 5 longitudinally, engaging, in this modification, arms 38, which are secured to springs 41. The tearing-blade 34 is constructed and operated in the same manner as tearing-blade 21, so further explanation of these elements in connection with this modified form of my invention is unnecessary.

The usual top-frame 42 of the register is placed over the platen of both the preferred and modified forms of my invention, and this top frame is pivotally secured to one side of the upper section B by hinges that are not shown in the drawings, but this frame, as well as the design of the body of the autographic register to which my invention is applied may be changed, as well as the other features of the machine, as hereinbefore described, may be modified without departing from the spirit of my invention.

In operating my improved register the paper strips used in connection therewith are first passed longitudinally over the platen and then arranged and adjusted so that the perforations of each strip will register with those of the others. The forward ends of the strips are then threaded through the space between the forward end of the platen and the superposed cross-bar 13,— arm 20 being first depressed so as to move pins 12 downward and the tearing-blade upward out of the way, as well as to cause the platen to move forward. When the platen reaches the limit of its forward movement the projecting ends of the paper strips are firmly grasped by the fingers and held stationary, while the pressure on arm 20 is removed, and the platen, pins and tearing-blade automatically return to their original positions. The strips are then pulled out or withdrawn until the next perforations therein come in superposed register with pins 12, whereupon the latter automatically shoot up through said perforations and stop the forward withdrawal of the strips. The pulled out portions of said strips are then torn off on the knife-edge of the tearing-blade, whereupon the register is then set for the next practical operation, which simply consists of depressing arm 20 and thus advancing said strips a distance less than that between the perforations thereof; causing the release of the advanced edges of the strips and holding them stationary, while the platen, pins and tearing-blade return to their original positions again, and finally pulling the strips out until the next perforations register over the pins, which latter again shoot up through the same and prevent the further withdrawal of said strips and permit the withdrawn strips to be torn off on the tearing-blade, and so on.

What I claim as new is:

1. In an autographic register comprising a suitable frame work from which strips of paper are withdrawn, the combination with a platen over which said paper passes longitudinally from the rear, of vertically disposed depressible pins located adjacent the forward end of said platen that engage said paper, and means for moving said pins forward and downward below the plane of said platen.

2. In an autographic register comprising a suitable frame-work from which a strip of paper is withdrawn, the combination with a platen over which said paper passes longitudinally from the rear, of vertically disposed depressible pins located adjacent the forward edge of said platen and adapted to penetrate said paper, a transverse superposed tearing-blade, and means for moving said pins forward to advance said paper and downward below the plane of the platen and simultaneously raising said tearing-blade off of the paper.

3. In an autographic register comprising a suitable frame-work adapted to inclose and journal a transversely disposed roll of paper, the combination with a platen over which said paper passes longitudinally from the rear, in combination with vertically disposed depressible pins, a transverse bar above the plane of the platen which has apertures that are engaged by said pins, a transverse superposed tearing-blade, and means for moving said pins forward and downward out of the apertures in said bar and simultaneously raising the tearing-blade from said paper.

4. In an autographic register comprising a suitable frame-work adapted to inclose and journal a transversely disposed roll of paper, the combination with a platen over which said paper passes longitudinally from the rear, of vertically disposed depressible pins, a transverse bar above the plane of the platen which has apertures that are engaged by said pins, a normally depressed transverse superposed tearing-blade, and spring returnable means whereby said pins are moved forward and downward out of the apertures in said bar and simultaneously raising the tearing-blade from said paper.

5. In an autographic register comprising a suitable frame-work adapted to inclose and journal a transversely arranged roll of paper, the combination with a longitudinally reciprocable flat horizontal plate over which said paper passes longitudinally from the rear, and springs for normally keeping it at the rear limit of its movement, of vertically disposed pins that pass up through apertures in said plate near the forward edge thereof, springs on one end of which said pins are mounted, and common means that push said plate forward and move said pins downward below the plane of the upper surface of said plate.

6. In an autographic register comprising a suitable frame-work adapted to inclose and journal a transversely arranged roll of paper, the combination with a longitudinally reciprocable flat horizontal plate over which said paper passes longitudinally from the rear, springs for normally keeping it at the rear limit of its movement, vertically disposed pins that pass up through apertures in said plate near the forward edge thereof, springs on one end of which said pins are mounted, and common means that push said plate forward and move said pins downward below the plane of the upper surface of said plate.

7. In an autographic register comprising a suitable frame-work adapted to inclose and journal a transversely arranged roll of paper, the combination with a longitudinally reciprocable flat horizontal plate over which said paper passes longitudinally from the rear, springs retracting said plate, of vertically disposed pins that pass up through apertures in said plate near the forward edge thereof, longitudinally disposed flat springs the rear ends of which are secured to the underside of said plate and on the forward ends of which said pins are mounted, arms secured to and depending down from said springs whose lower ends are bent rearward, and a cam adapted to engage said arm and push said plate forward and then draw said springs downward.

8. In an autographic register comprising a suitable frame-work adapted to inclose a strip of paper, the combination with a longitudinally reciprocable flat horizontal plate over which said paper is withdrawn longitudinally from the rear, springs for normally keeping it at the rear limit of its movement, vertically disposed pins that pass up through apertures in said plate near the forward edge thereof, longitudinally disposed flat springs the rear ends of which are secured to the underside of said plate and on the forward ends of which said pins are mounted, arms secured to and depending down from said springs whose lower ends are bent rearward, a cam adapted to engage said arm and push said plate forward and then draw said springs downward, and a transverse superposed tearing-blade, and means for raising the same from engagement with the paper when said pins are depressed.

9. In an autographic register comprising a suitable frame-work adapted to inclose and journal a transversely positioned roll of paper provided with a longitudinally disposed series of equi-distant alining perforations, the combination with a longitudinally reciprocable plate having automatic means whereby same is returned to the rear limit of its movement, of devices situated near the front edge of said plate which penetrate through said perforations as the paper is drawn over the same and arrest the progress thereof independent of said plate and which withdraw from said perforations when the said plate reaches the limit of its forward movement.

10. In an autographic register comprising a suitable framework adapted to inclose a strip of paper provided with a longitudinally disposed series of equi-distant alining perforations, the combination with a longitudinally reciprocable platen, and means whereby same is returned to the rear limit of its movement, of devices situated near the front edge of said platen that engage said perforations *seriatim* as the paper is drawn over the same, and means for withdrawing said devices from said perforations when the said platen reaches the limit of its forward movement.

11. In an autographic register comprising a suitable frame-work adapted to inclose and journal a transversely positioned roll of paper provided with a longitudinally disposed series of equi-distant alining perforations, the combination with a longitudinally reciprocable platen, and means for returning the same to the rear limit of its movement, of vertical pins that pass up through perforations in said platen near the forward end thereof, longitudinally disposed flat springs the rear ends of which are secured to the underside of said platen and on the front ends of which said pins are mounted, arms depending from said springs the lower ends of which are bent rearward, cams engaging said arms, a transverse rock-shaft on which said cams are securely mounted one end of which extends beyond its bearing in the side wall of said frame-work, and a handle on said extended end.

12. In an autographic register comprising a suitable frame-work adapted to inclose and journal a transversely positioned roll of paper provided with a longitudinally disposed series of equi-distant alining perforations, the combination with a longitudinally reciprocable platen, and means for returning the same to the rear limit of its movement, of vertical pins that pass up through perforations in said platen near the forward end thereof, longitudinally disposed flat springs the rear ends of which are secured to the under side of said platen and on the front ends of which said pins are mounted, arms depending from said springs the lower ends of which are bent rearward, cams engaging said arms, a transverse rock-shaft on which said cams are securely mounted one end of which extends beyond its bearings in the side wall of said frame-work, a handle on said extended end, a transverse tearing-blade disposed above said platen and normally bearing on the paper, arms depending from the ends of said blade one of which is provided with an extension, a rock-shaft the ends of which extend through their bearings in the side-walls of the frame-work and have the end arms of the tearing-blade mounted thereon, and a cam mounted on said cam-shaft next its handle and adapted to engage said extension.

13. In an autographic register comprising a suitable frame-work adapted to inclose a strip of paper provided with a longitudinally disposed series of equi-distant alining perforations, the combination with a longitudinally reciprocable platen, and means for returning it to the rear limit of its movement, of vertical pins that are adapted to engage perforations in said platen, longitudinally disposed flat springs secured to the under side of said platen and on the front ends of which said pins are mounted, arms depending from said springs the lower ends of which are bent rearward, cams engaging said arms, a transverse rock-shaft on which said cams are securely mounted one end of which extends beyond its bearings in the side-wall of said frame-work, a handle on said extended end, a transverse tearing-blade disposed above said platen and normally bearing on the paper, arms depending from the ends of said blade one of which is provided with an extension, a transverse rock-shaft the ends of which extend through their bearings in the side-walls of the frame-work and have the end arms of the tearing-blade mounted thereon, a cam that engages said extension and is mounted on the cam-shaft next its handle, a transverse superposed bar bridging the platen that has perforations therein in alinement with said pins.

14. An autographic register comprising a suitable frame-work inclosing a strip of paper having a longitudinally disposed series of equi-distant alining perforations, in combination with a device situated at the front end of said frame-work and arranged to enter said perforations *seriatim*, and means for moving said device forward and withdrawing it from said perforations whereby said paper is initially advanced a distance less than that between said perforations to a position where it can be grasped by the fingers.

In witness whereof, I have hereunto set my hand this 29th day of February, 1916.

ENGLAND J. BARKER.

Witnesses:
GILBERT J. MILLER,
PETER J. SCHILTY.